United States Patent
Brown

Patent Number: 6,137,530
Date of Patent: *Oct. 24, 2000

[54] COMBINATION CONTINUOUS MOTION AND STATIONARY PIN REGISTRATION FILM GATE FOR TELECINE

[75] Inventor: Brian K. Brown, Grayson, Ga.

[73] Assignee: Steadi-Film Corp., Atlanta, Ga.

[*] Notice: This patent issued on a continued prosecution application filed under 37 CFR 1.53(d), and is subject to the twenty year patent term provisions of 35 U.S.C. 154(a)(2).

[21] Appl. No.: 08/832,389

[22] Filed: Apr. 2, 1997

[51] Int. Cl.$^7$ .................................................. H04N 5/253
[52] U.S. Cl. .................................. 348/96; 348/97; 226/58
[58] Field of Search .................. 348/95–98; 352/187, 352/221, 223, 224, 188; 226/87, 88, 58; H04N 5/253

[56] References Cited

U.S. PATENT DOCUMENTS

| | | | |
|---|---|---|---|
| 2,418,943 | 4/1947 | Jones | 88/18.4 |
| 2,425,217 | 8/1947 | Wienke | 88/17 |
| 2,552,255 | 5/1951 | Capstaff | 95/75 |
| 3,051,955 | 8/1962 | Pfleger et al. | 346/110 |
| 3,271,099 | 9/1966 | Debrie | 352/224 |
| 3,447,866 | 6/1969 | Heisler | 352/119 |
| 3,720,461 | 3/1973 | Reinsch et al. | 352/224 |
| 4,054,912 | 10/1977 | Millward et al. | 358/216 |
| 4,104,680 | 8/1978 | Holland | 358/132 |
| 4,149,191 | 4/1979 | Longchamp | 358/214 |
| 4,184,177 | 1/1980 | Millward | 358/214 |
| 4,205,337 | 5/1980 | Millward | 358/54 |
| 4,524,392 | 6/1985 | Poetsch | 358/214 |
| 4,726,674 | 2/1988 | Smith et al. | 354/203 |
| 4,823,204 | 4/1989 | Holland | 358/347 |
| 5,266,979 | 11/1993 | Brown et al. | 352/224 |
| 5,430,477 | 7/1995 | Bachmann et al. | 348/97 |
| 5,529,232 | 6/1996 | Blanding | 226/58 |
| 5,644,356 | 7/1997 | Swinson et al. | 348/96 |
| 5,713,503 | 2/1998 | Galt et al. | 226/32 |

FOREIGN PATENT DOCUMENTS

| | | |
|---|---|---|
| 43 37 156 C1 | 9/1994 | Germany. |
| 4686 | of 1896 | United Kingdom. |
| 1 519 398 | 7/1978 | United Kingdom. |
| WO 88/01822 | 3/1988 | WIPO. |

*Primary Examiner*—Chris S. Kelley
*Assistant Examiner*—Tung Vo
*Attorney, Agent, or Firm*—Morris, Manning & Martin; John R. Harris

[57] ABSTRACT

A combination film gate for a continuous motion or real-time motion picture telecine that is also operative to pin register a frame of film for stationary scanning. A housing supports and transports a film in continuous motion past a frame aperture. A precision milled entry guide roller receives the film from a feed spool, edge-stabilizes the film, and directs the film to a precision milled entry sprocket. The entry sprocket is positioned prior to the frame aperture, pin registers the film, and directs the film across the frame aperture. A precision milled exit sprocket positioned subsequent to the frame aperture receives the film after it passes across the frame aperture and pin registers the film. The precision sprockets and rollers serve as film stabilizing means. Film jitter and weave are mechanically removed to less than about 20 nanoseconds without the use of complex expensive electronics. A pin assembly with precision milled pins is provided that can be lowered into the film perforations to hold the film stationary for scanning. The pin assembly provides a kinematic mount that repeatably, and reliably, pin registers a selected frame of film for stationary scanning.

36 Claims, 11 Drawing Sheets

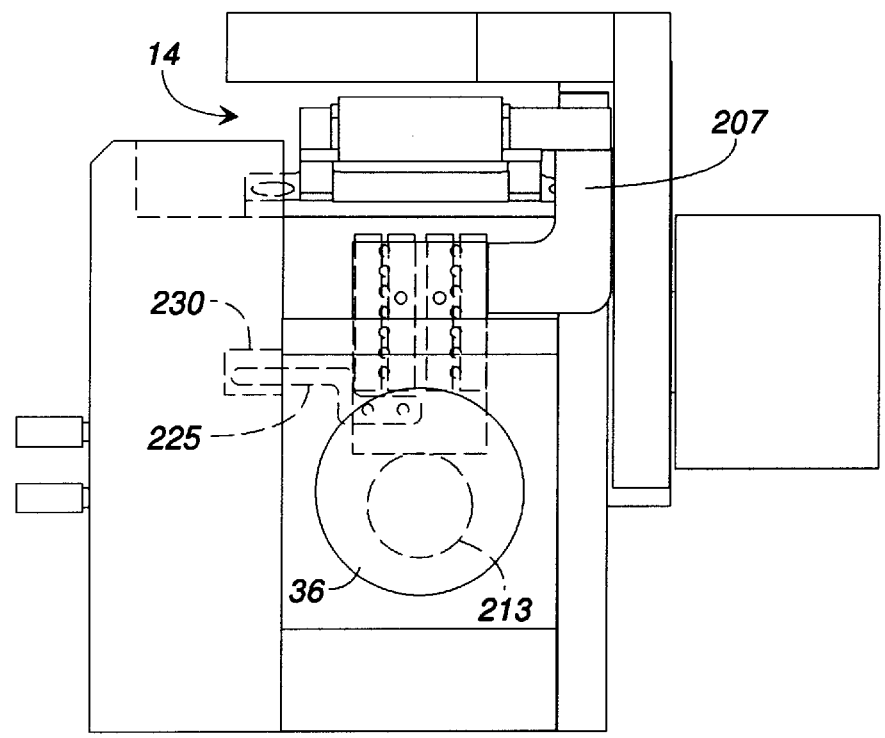
FIG 6
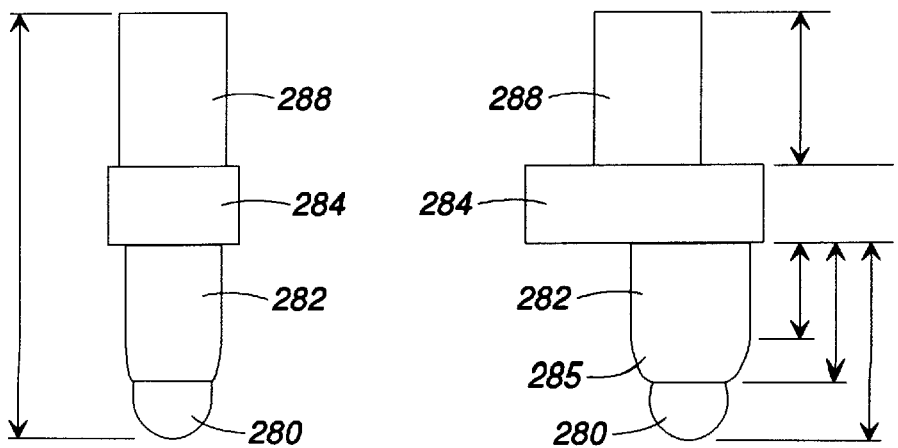
FIG 12A   FIG 12B

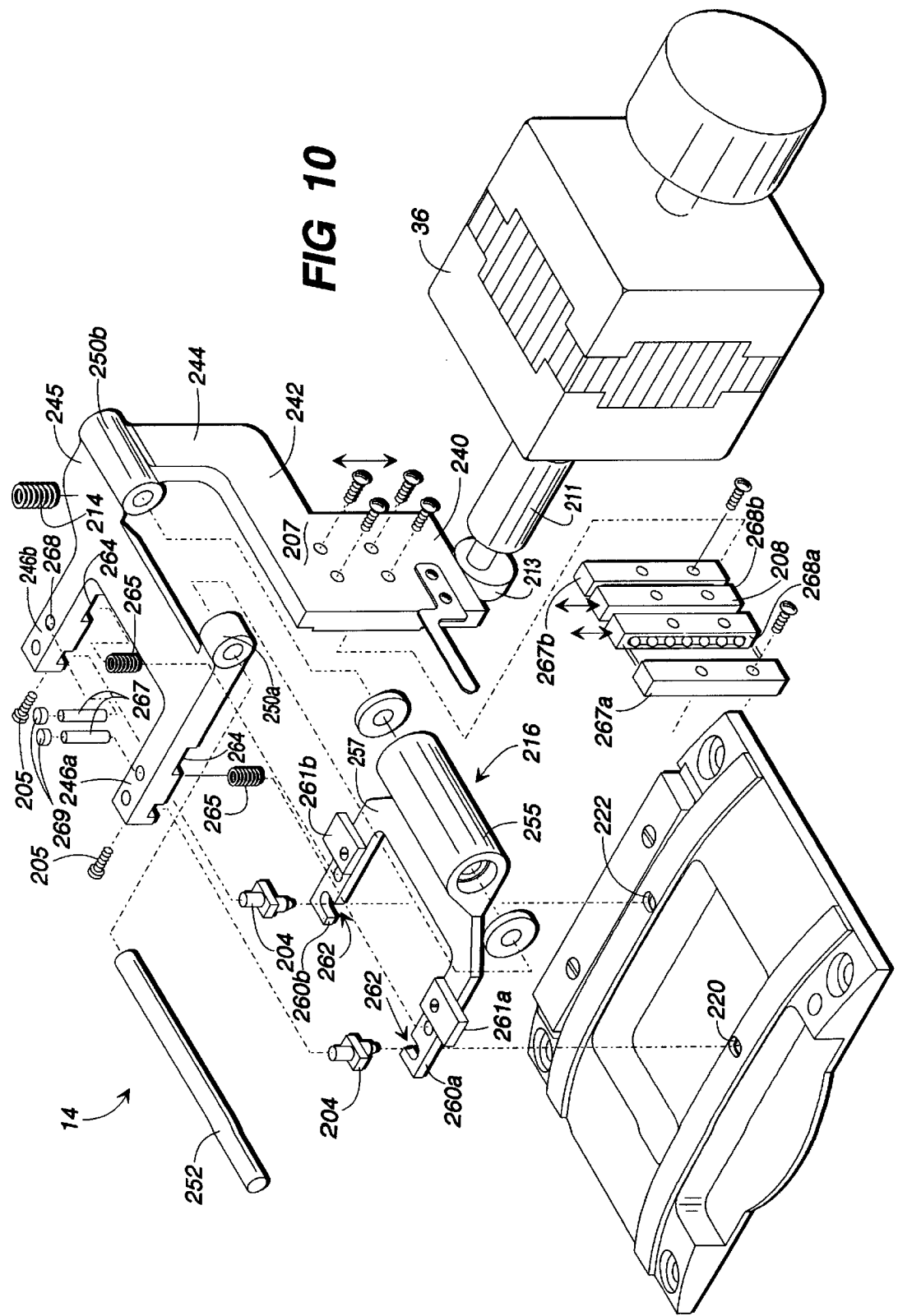

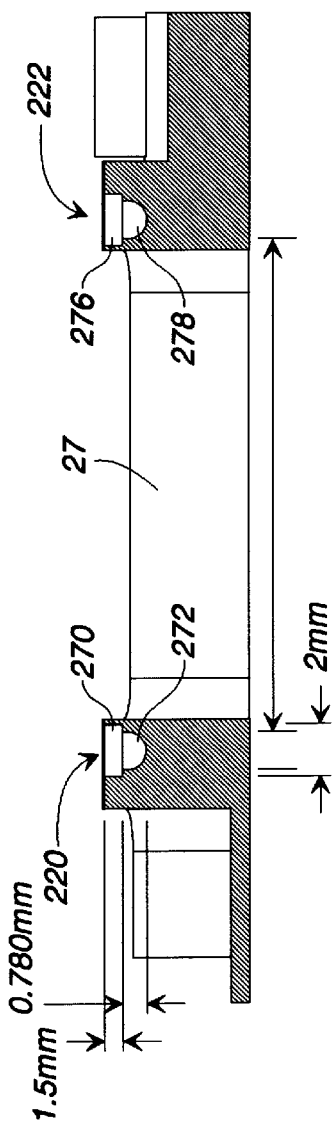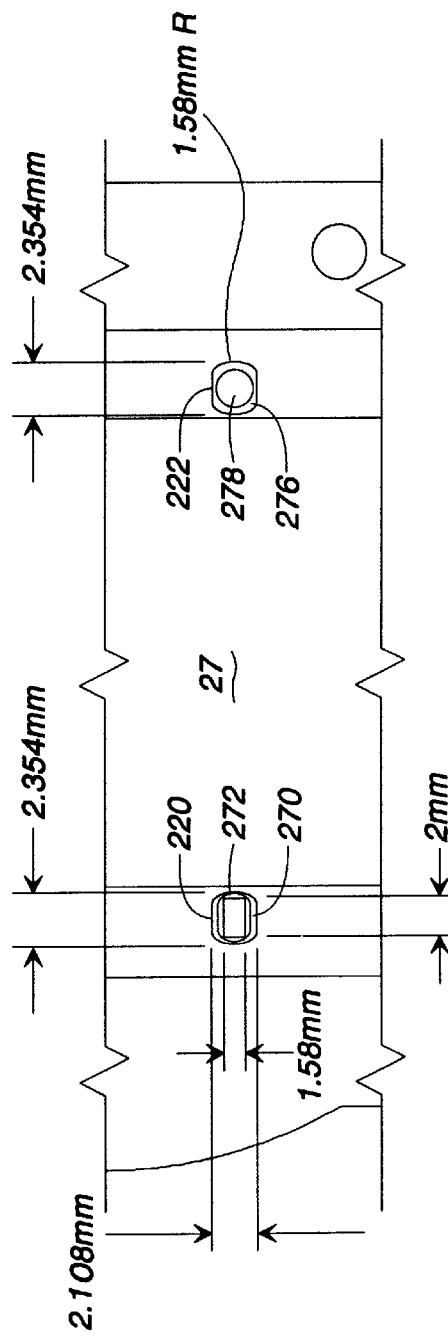

COMBINATION CONTINUOUS MOTION AND STATIONARY PIN REGISTRATION FILM GATE FOR TELECINE

TECHNICAL FIELD

The present invention relates generally to apparatus for transferring motion picture film to video signals utilizing a telecine, and more particularly relates to an improved film gate for substantially reducing film weave or jitter in a "real-time" or continuous motion telecine that is also capable of pin registering the film while stationary for improved compositing work.

BACKGROUND OF THE INVENTION

A "telecine" is an apparatus utilized to transfer a motion picture film, for example a negative film shot in a motion picture camera, to a video signal format for storage or broadcast. Telecines are employed by motion picture and television production and post-production facilities to create video tapes of movies, commercials, news clips, and the like.

In a typical telecine, a source of light such as a flying spot scanner or a laser beam scans the film, or a light bulb projects the image onto a light detecting array, frame by frame, in a line-by-line or raster scan fashion. The light from the light source is transmitted through the film in a "film gate" on the telecine, and received by a light detector positioned to receive light transmitted through the film. A film gate includes an aperture ("frame aperture") for passing light from the light source to the telecine light detector and supports the film as it is scanned. The transmitted light is then converted into electrical signals, converted into an appropriate video signal format such as NTSC or PAL, and stored on a video tape or other storage device.

A flying spot telecine is an apparatus in which consecutive frames in a cinema or movie film are optically scanned in a raster fashion by a light beam of small cross-section (called a "flying spot"), wherein the picture information is thereby modulated on the light beam and converted by one or more opto-electronic detectors into electrical video signals. From the electrical video signals, a television signal is ultimately derived from scanning respective consecutive film frames.

There are two different types of telecines—(1) conventional intermittent or "start/stop", and (2) real-time or continuous motion. In the intermittent or "start/stop" type telecine, each frame of the film is located or "registered" at the frame aperture and held motionless during the scanning process. In the real-time or continuous motion telecine, the film is moved continuously with a film drive to move the film through the machine during the scanning process.

A particular difficulty encountered in telecine devices is the maintenance of the image on the film in reference to a stable image reference. The problem is particularly pronounced when images from different sources are superimposed, for example, when a computer-generated title or other graphics are superimposed against a scene generated by a motion picture film. If the image on the film is not stable relative to the superimposed graphics such as a title, the title may be seen to weave or jitter in relationship to the background. The jitter or weave problem derives from the fact that the positional reference for the film and for the overlaid graphics are not the same. When a film is originally shot in a camera, the image is mechanically registered on a particular film frame relative to the sprocket holes in the film. The tines of a sprocket in the camera engage the sprocket holes in the film to register the film relative to the camera's optics. Such devices, including cameras, are considered mechanically or machine pin registered.

When a film from a motion picture camera is then to be transferred to video in a telecine, the film may not necessarily be machine pin registered but drawn through the machine by a continuous motion film drive. Typically, a drive capstan pulls the film through the film gate. In some continuous motion telecines, the film is edge-guided during the transfer. Film weave or jitter may be introduced as the edge of the film varies relative to the position of the sprocket hole. It is known that film edges tend to vary in distance from the sprocket holes due to manufacturing imperfections and tolerances in the film.

Various approaches have been employed to minimize film weave in film-to-tape transfers. One approach involves use of a single mechanical sprocket drive for moving the film through the telecine. This method introduces small but pronounced speed changes as the sprocket tines enter the sprocket holes, and therefore introduces another source of jitter. Moreover, mechanical sprocket drives are not favored because of the wear and tear on the film.

Other mechanical solutions involve mechanical pin registration with the start/stop devices discussed above. In this approach, the film sprocket holes are lowered, frame by frame, onto stationary register pins with a stepping motor controlled by an auxiliary computer. The film is held steady by pins during the transfer, and then a gate attachment is released to allow the film to advance. Such devices are complicated mechanically, limited in speed, and also produce significant wear and tear on the film because of repeated acceleration and deceleration of the film.

Telecines with continuous film motion are often believed to provide the simplest and best operation if the problems of registration, weave, and jitter can be solved. Flying spot telecines of the continuous motion type require a means for supporting the moving film in a precise position with respect to the optical system of the telecine that focuses an image of the flying spot generated by a cathode ray tube (CRT) through the film. This precise position must be accurately maintained over an area at least as large as one film frame in order to maintain focus. The means for maintaining the position of the film is conventionally referred to as a "film gate". U.K. Patent Specification 1 519 398 describes a film gate that is curved in the direction of motion of the film in an optical system for focusing light on the film in the film gate, together with corrective optics.

One particular advantageous approach to the problem of film weave and jitter is shown in U.S. Pat. No. 5,266,979, entitled "Film Gate for Continuous Motion Telecine", which is owned by the same assignee as the present invention. This patent describes an improved film gate for a continuous motion telecine that employs a precision milled entry guide roller that receives film from a feed spool, edge-stabilizes the film, and directs the film to a precision milled first entry sprocket. The entry sprocket is positioned prior to the frame aperture, pin registers the film, and directs the film across the frame aperture. A precision milled exit sprocket positioned subsequent to the frame aperture receives the film after it passes across the frame aperture and pin registers the film. A precision milled exit guide roller receives the film from the exit sprocket, edge stabilizes the film, and guides the film to a drive capstan and take up reel. The precision sprockets and rollers serve as film stabilizing means. Film jitter and weave are mechanically removed to less than about 20 nanoseconds without the use of complex expensive electronics.

One particular problem with the use of this device is the need for composite work involving a single frame of film. In this type of editing work, the telecine operator desires to overlay or "composite" video, images, or other graphics from another source with the image from the telecine. The film frame serving as a part of the composition must be held stationary during the scan; sometimes the operator must go back and forth between frames and return to a particular frame.

However, with a conventional servomechanism-driven telecine, the operator has no assurance that the servomechanism will return a selected frame to a precise point—the selected frame can be in a slightly different position by several microns and thereby introduces an error. Many telecine servomechanisms can only return a given frame to within about ¼ of a video scan line, which is insufficient for satisfactory compositing work.

Telecine operators desire a system wherein they can locate a frame (or group of frames) in one roll of film, create a video of a number of frames, run another roll of film to locate another frame or group of frames, and composite the two video images electronically. With a continuous motion telecine, prior to the present invention this has not been possible to do with the desired level of precision.

Accordingly, there is a need for an apparatus that can correct film weave and jitter with a continuous motion telecine, which can also repeatably and reliably pin register a film frame for a stationary frame scan.

SUMMARY OF THE INVENTION

The present invention provides a combination film gate that provides continuous motion operation as well as stationary pin registered operation. The invention is simple and does not rely upon any complex electronics such as sprocket hole scanners. Briefly described, the film gate includes a precision milled entry roller that provides an edge guide function, a precision milled entry sprocket that positively registers at least one row of sprocket holes in the film immediately prior to the frame aperture, a precision milled exit sprocket that positively registers at least one row of sprocket holes in the film immediately subsequent to the frame aperture, and a selectably engageable pin assembly including registration pins that engage with film sprocket perforations to hold the film stationary.

More particularly described, the combination film gate comprises a housing for supporting and transporting the film in continuous motion past a scanning means on the telecine. The housing includes a frame aperture operative for receiving light from the telecine's light source, passing the light through the film, and directing the light to the telecine's light detector. A precision milled entry sprocket is positioned adjacent to the frame aperture for guiding the film across the frame aperture. The entry sprocket includes a ring of first sprocket teeth and a ring of second sprocket teeth. The first sprocket teeth are sized and shaped substantially in accordance with and to the tolerances of both the lateral and longitudinal dimensional specifications for the film sprocket holes, as established by film industry standards. The second sprocket teeth are sized and shaped substantially in accordance with and to the tolerances of the longitudinal dimensional specifications for the film sprocket holes.

A precision milled exit sprocket is positioned adjacent to the film aperture and receives the film after passing across the frame aperture. The exit sprocket also includes a ring of first sprocket teeth and a ring of second sprocket teeth. As in the entry sprocket, the first sprocket teeth of the exit sprocket are sized and shaped substantially in accordance with and to the tolerances of both the lateral and longitudinal dimensional specifications for the film sprocket holes. The second sprocket teeth of the exit sprocket are also sized and shaped substantially in accordance with and to the tolerances of the longitudinal dimensional specifications for the film sprocket holes.

By firmly and positively registering the first sprocket teeth in at least one row of sprocket holes along one side of the film in both the lateral and longitudinal direction, and by positively registering the opposite row of sprocket holes in the longitudinal dimension, the film is held steady both as it enters the frame aperture and as it exits the frame aperture, and imparts substantial stability to the film frame as it is scanned in the frame aperture.

The film gate further includes an entry guide roller mounted to the housing prior to the entry sprocket for receiving the film from a feed spool. The entry roller includes a central recessed portion having a width substantially the same as the width of the film, with outer guide portions adjacent the recessed portion. The film travels within the recessed portion and is held therein by the outer guide portions. The provision of the edge guidance in the entry roller lends further lateral stability to the film as it is fed to the entry sprocket and removed from the exit sprocket.

For stationary film scanning, a pin assembly pin registers the film perforations and holds the film stationary. The pin assembly comprises pin support arms mounted to a vertically movable cam plate. The pin support arms carry precision milled registration pins for engaging with the film perforations repeatably and reliably.

The frame aperture includes precision milled pin registration recesses in the surface that receive the registration pins. Also provided is a means for lowering the cam plate with pin support arms and registration pins to engage the registration pins in the pin registration recesses. The lowering means disclosed is a stepping motor and a cam affixed to the shaft of the stepping motor. The cam engages with the cam plate to raise and lower the pin assembly in response to signals from the telecine control circuit.

Also provided is a film stripper for stripping the film off of the registration pins when the registration pins are disengaged from the film sprocket perforations. The film stripper comprises a spring-biased pivotable arm mounted beneath the pin support arms, with an opening defined therein for allowing the registration pins to protrude therethrough when engaging with the film sprocket perforations.

The disclosed precision milled registration pins comprise a pin shaft having dimensions substantially sized and shaped substantially in accordance with both the lateral and longitudinal dimensional specifications for the film sprocket holes. A hemispherical ball is provided on the end thereof for seating in the registration recesses provided in the frame aperture. Preferably, there is a pair of registration pins, and the frame aperture includes a first recess and a second recess defined therein for receiving the registration pins. The first recess is precision milled to define a cavity having substantially the same dimensions as the hemispherical ball of one of the registration pins, and the second recess is precision milled to provide a rectangular cavity to provide a kinematic mount.

For continuous "real time" scanning, the precision milled entry and exit sprockets, precision milled recessed entry guide roller, and film aperture edge guide provide a combination of stable platforms for stabilizing the film as it approaches the frame aperture and holding the film steady as it passes across the frame aperture and is scanned. In this manner, the present invention substantially improves upon prior art film gates that rely upon capstan drives without any guide means, or rely solely upon sprocket drives or edge guidance. In addition, a capstan-drive continuous motion telecine employing a film gate constructed as in the present invention inflicts substantially less wear and tear on the film than intermittent-type telecines.

For stationary frame film scanning, the registration pins are lowered into the film perforations when the film is stopped, and holds the film firmly for scanning. The precision dimensions of the registration pins ensure a repeatable return to a given frame, to within less than ¼ of a scan line.

Accordingly, it is an object of the present invention to provide a combination film gate for a continuous motion or real-time motion picture telecine that is also operative to provide stationary pin registration.

It is another object of the present invention to provide a combination film gate that provides continuous motion operation with substantially reduced film weave and jitter produced as a result of non-registration of the film relative to the frame aperture.

It is another object of the present invention to provide an apparatus for reducing film weave in a telecine to less than 20 nanoseconds during continuous motion operation, but which can also provide stationary pin registration.

It is another object of the present invention to provide a film gate for a telecine that provides a plurality of stable supports and guides for a motion picture film as it passes across a frame aperture in the telecine during continuous motion, but which can also provide stationary pin registration.

It is another object of the present invention to provide a combination continuous motion and stationary pin registered film gate for a telecine that positively registers the film perforations during continuous motion and during stationary scanning.

These and other objects, features, and advantages of the present invention will become more clear upon reference to the accompanying drawings and the following detailed description.

BRIEF DESCRIPTION OF THE DRAWINGS

FIG. 6 is a right end view of the preferred film gate.

FIG. 10 is an exploded perspective view of the pin assembly and its relationship to the aperture plate.

FIG. 11, consisting of FIGS. 11A and 11B, illustrate details of the milling of the aperture plate to create the pin registration recesses.

FIG. 12, consisting of FIGS. 12A and 12B, illustrate details of the registration pins.

DETAILED DESCRIPTION OF THE PREFERRED EMBODIMENT

Figure 1:
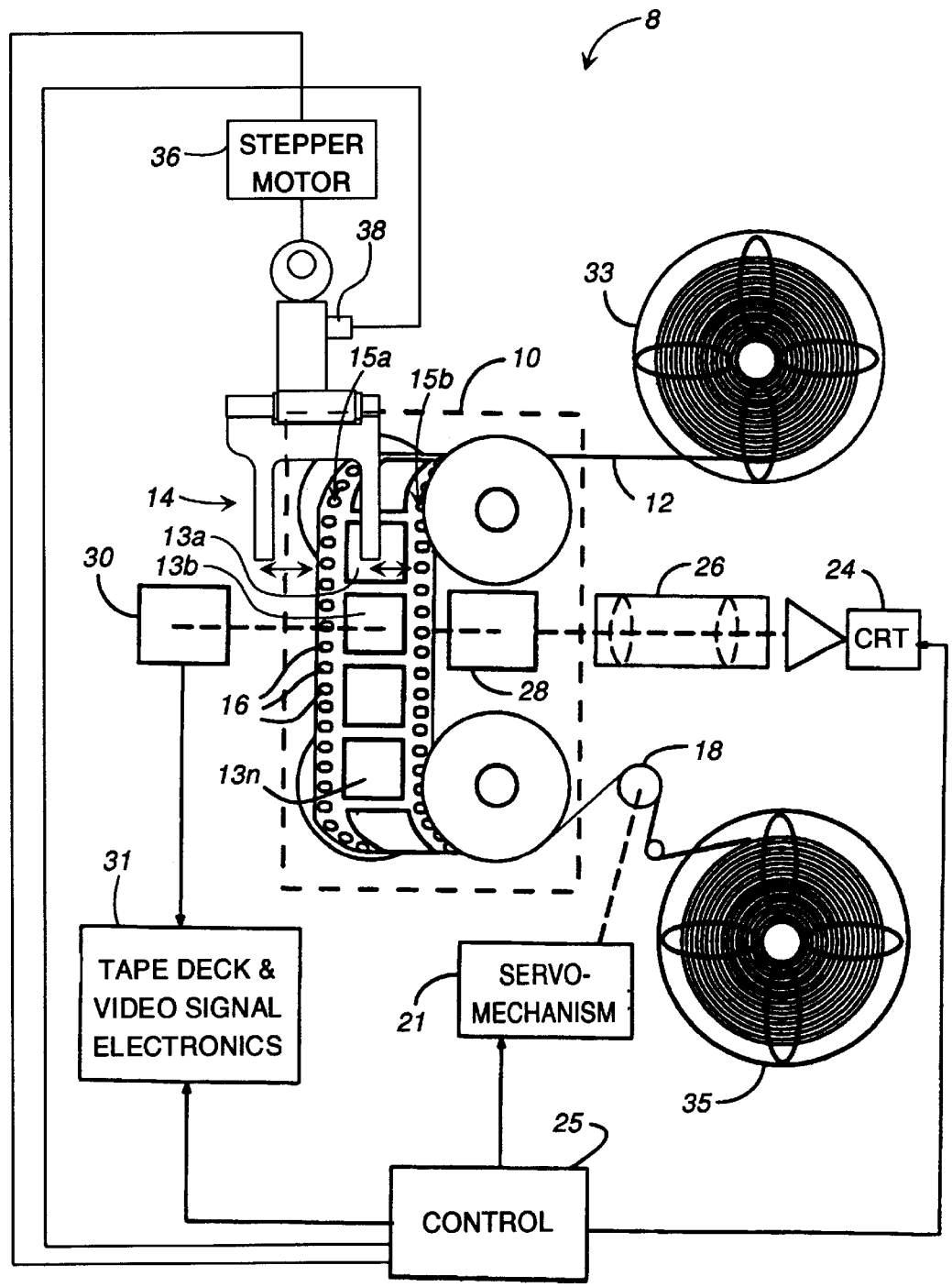
FIG. 1 schematically illustrates the process of transferring a motion picture film to a video signal in a telecine, and shows the position and function of a film gate in the telecine.

Referring now to the drawings, in which like numerals indicate like elements throughout the several views, FIG. 1 schematically illustrates a motion picture telecine 8 that incorporates the preferred embodiment of an improved combination continuous motion/pin registered film gate 10 constructed in accordance with the present invention. As will be known to those skilled in the art, a telecine such as the one 8 illustrated in FIG. 1 is used for film-to-video tape transfers. These film-to-tape transfers are conducted by scanning a film 12, typically 35 mm or 16 mm movie film, by a light source. The film 12 is provided in continuous motion or "real time" from a supply reel 33 to the film gate 10, which supports the film during scanning. The film 12 will be understood to comprise a plurality of frames 13a, 13b, . . . 13n supported on the substrate of the film. The film 12 also includes two rows 15a, 15b of perforations 16, one row along each longitudinal edge of the film. The film is typically pulled through the gate 10 by a frictional drive capstan 18 that is powered by servomechanism 21.

The telecine 8 further includes a source of light 24 such as a cathode ray tube (CRT), laser light, or light bulb. The light source 24 is controlled by control circuit 25, which is also connected to the servomechanism 21, so that scanning of each frame 13 on the film will be synchronized to the movement of the film. The light from the light source 24 passes through a lens assembly 26, through a light or frame aperture 28 in the film gate 10, through the film, and onto a light detecting means or "cell box" 30. The lens assembly 26 focuses the light from the light source onto the film. The light detecting means or cell box 30 produces a video signal corresponding to the image on the film. The video signal is typically provided to a magnetic tape recorder or deck 31.

The preferred film gate 10 is constructed as described herein to provide both continuous motion operation and pin registered stationary operation. As regards the aspects involved with continuous motion operation, certain of the features of U.S. Pat. No. 5,266,979, the disclosure of which is incorporated herein by reference and made a part hereof, are employed. To provide for pin registered stationary operation, the film gate 10 includes a pin assembly 14 that is operative to engage registration pins into the film perforations. The pin assembly is driven by a stepper motor 36, which raises and lowers the pin assembly under control of signals from the control circuit 25. A position detector 38 detects whether the pin assembly is seated with registration pins engaged with the film, and provides a signal indicative thereof to the control circuitry 25.

A typical telecine of the type with which the present invention is useful is a Mark III telecine manufactured and sold by Rank Cintel, associated with The Rank Organisation, Ltd., London, England. U.S. Pat. No. 4,184,177 is exemplary of the Rank Cintel telecine apparatus for consecutive frame scanning of continuous motion film, and the disclosure is incorporated herein. However, the present invention is also useful with other types of telecines, such as those that use a light bulb to project the film frame image onto a charge-coupled device (CCD) imaging sensor array.

Those skilled in the art will understand that in the television production and post-production industry, film-to-tape transfer telecine apparatus are often used in conjunction with fresh 35 mm motion picture film that has recently been obtained from a motion picture camera. This is in contrast to telecine devices operative with theater release film prints that include sprocket holes manufactured to a different specification. Motion picture camera film typically is manufactured to ANSI Standard PH22.93-1980, with Bell & Howell (B&H) perforations. Currently popular camera film includes the improved Kodak rounded ("KR") perforations with 0.005 inch corner radii for minimizing the weakness for tearing at the corners of the film perforations.

Figure 2:
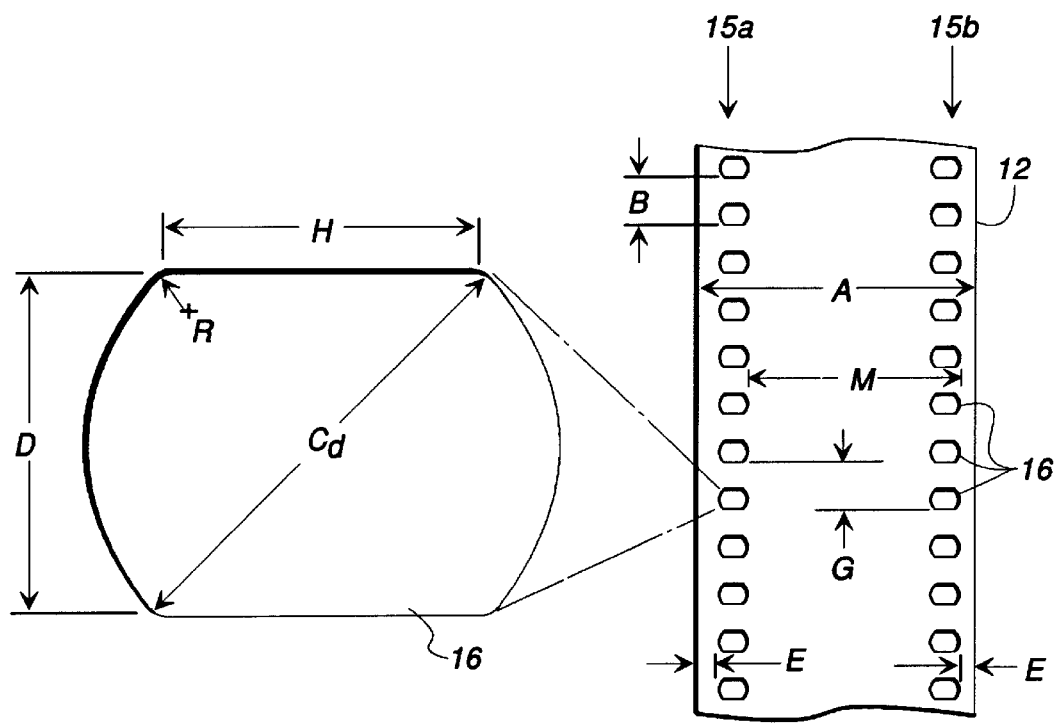
FIG. 2 illustrates a section of 35 mm motion picture film manufactured to the specifications of the ANSI standards including B&H perforations and KR corners.

With reference to FIG. 2, the following is a table of specifications for 35 mm motion picture film as set forth in ANSI standard PH22.93-1980:

| | DIMENSIONS | INCHES | MILLIMETERS |
|---|---|---|---|
| A | Film width | 1.377 ± 0.001 | 34.975 ± 0.025 |
| B | Perforation pitch (long) | 0.1870 ± 0.0004 | 4.750 ± 0.010 |
| B' | Perforation pitch (short) | 0.1866 ± 0.0004 | 4.740 ± 0.010 |
| $C_d$ | Perforation width (diameter) | 0.1100 ± 0.0004 | 2.794 ± 0.010 |
| D | Perforation height | 0.0730 ± 0.0004 | 1.854 ± 0.001 |
| E | Edge to perforation | 0.079 ± 0.002 | 2.01 ± 0.05 |
| G | Perforation misalignment | 0.001 max | 0.03 max |
| H | Perforation chord width (BH perforation) | 0.082 calculated | 2.08 calculated |
| L | 100 consecutive perforation pitches (long) | 18.700 ± 0.015 | 474.98 ± 0.38 |
| L' | 100 consecutive perforation pitches (short) | 18.660 ± 0.015 | 473.96 ± 0.38 |
| M | Lateral perforation displacement | 1.109 ± 0.001 | 28.17 ± 0.03 |
| R | Corner radius | 0.005 max | 0.13 max |

It should be understood at this juncture that films not intended for use in pin registration systems, for example 35 mm color print film incorporating Kodak standard (KS) perforations, being typically used only for release or theater prints, may not benefit from the advantages provided by the present invention with the use of 35 mm color negative film.

Figure 3:
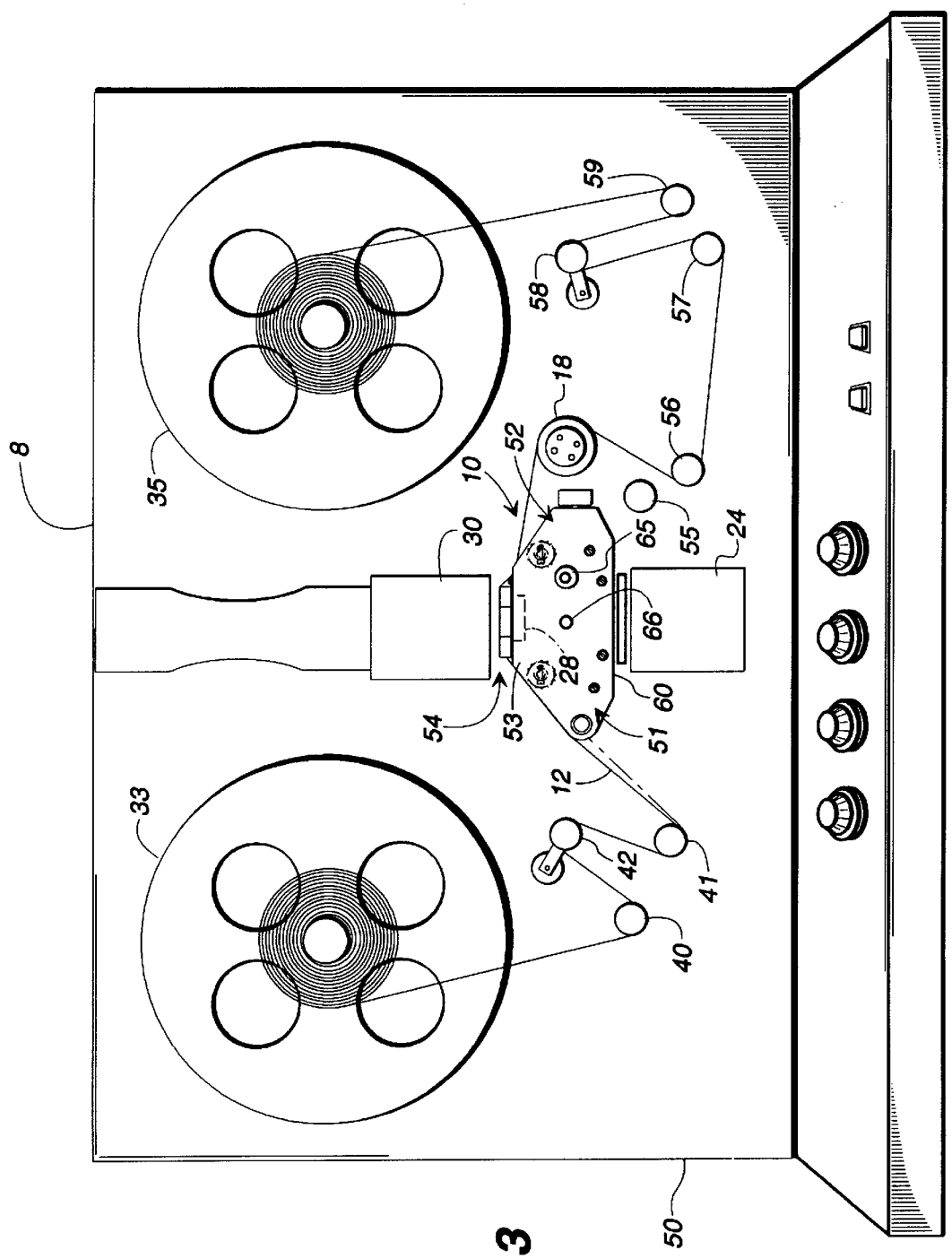
FIG. 3 illustrates the front panel of a typical motion picture telecine with which the present invention is used, showing the placement of the preferred embodiment of a combination film gate constructed in accordance with the present invention.

FIG. 3 illustrates the front panel 50 of a Rank Cintel Mark III telecine 8 incorporating the preferred embodiment of a combination continuous motion/stationary pin registered film gate 10 constructed in accordance with the present invention. The film 12 is supplied from a supply reel 33 via a series of idler rollers 40, 41 and tensioning roller 42 to the film gate 10. The film enters the film gate 10 at an entry end 51 of the film gate, over the frame aperture 28, and thence from an exit end 52. The film then passes over a drive capstan 18, and then to an idler roller 56. (The telecine may include an idler roller 55 positioned beneath the capstan, but threading under this roller prior to engaging the capstan is optional with the present invention.) After exiting the rollers associated with the capstan 18, the film passes over idler roller 57, tensioning roller 58, and idler roller 59 before being taken up by the take up reel 35.

The film 12 is inserted into the film gate 10 at a front loading slit 54 provided in the front panel of the film gate. The front loading slit 54 allows the film to be inserted along a pathway substantially parallel to the horizontal pathway of the film across the frame aperture 28, thereby providing for convenient and quick front loading of the film gate.

A CRT 24 or other light source on the telecine directs light through the film gate 10, the internal lens assembly 26 (not visible in FIG. 3), frame aperture 28, the film, and thence into the light detecting means 30. A focusing knob 65 on the front panel of the film gate allows the internal lens assembly to be adjusted and then locked into position with a locking knob 66.

The CRT 24 and light detecting means 30 comprise a film scanning means associated with the telecine. Inasmuch as the construction and operation of the scanning means and other aspects of the telecine 8 do not form a part of the present invention, further discussion of same will not be provided herein.

Figure 4:
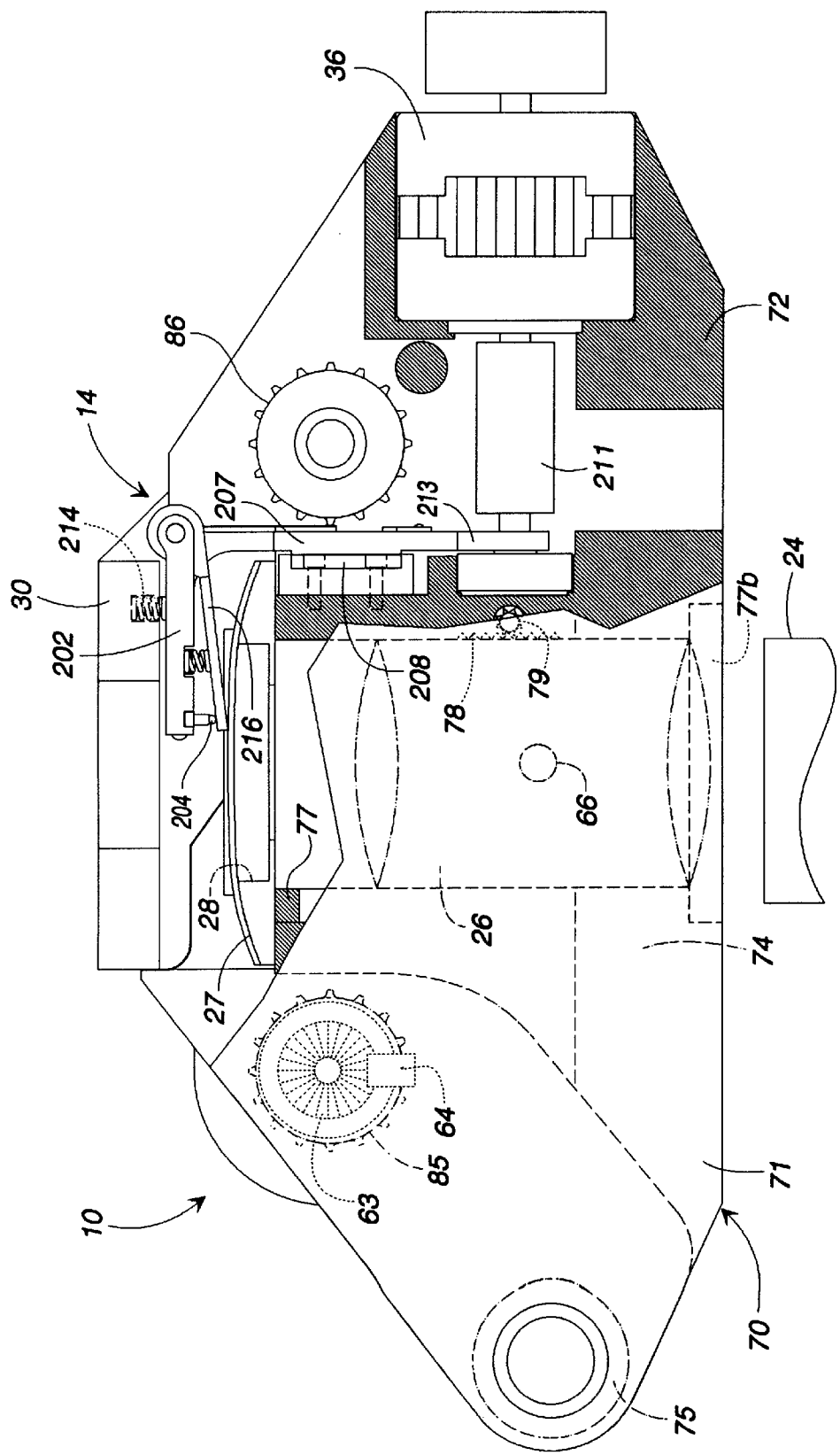
FIG. 4 is a front plan view of the preferred embodiment of a combination film gate constructed in accordance with the present invention, partially broken away to illustrate internal components.

Turning next to FIG. 4, the improved film gate 10 comprises several precision milled guides, sprockets, and edge-stabilizing rollers that individually, and in combination, stabilize the film as it moves past the frame aperture 28.

The preferred embodiment of the film gate comprises a housing 70 for supporting and transporting the film 12 past the scanning means on the telecine. The housing supports an aperture plate 27 having a frame aperture 28 defined therein for transmitting light from the light source 24 through a frame on the film and thence to the light detector 30.

The housing 70 is preferably a single piece of 6061 type aluminum milled into a generally "U"-shape to enclose the various elements of the system. The housing 70 includes a first or outer support portion 71, a second or inner support portion 72 positioned toward the telecine, and a central support portion 74 forming the base of the "U" shape(shown in dotted lines, and better seen in FIG. 5) positioned between the portions 71, 72. The support portions 71, 72 have precisely milled faces and are milled to a tolerance of ±0.0001 inches between them.

The support portions 71, 72 support a precision milled entry guide roller 75, and entry and exit sprockets 85, 86. As shown in FIG. 4, the entry guide roller 75 is positioned to receive the film 12 as it enters the film gate and direct the film upwardly at an angle to the entry sprocket 85. The entry sprocket 85 redirects the film to a horizontal plane and across the aperture plate 27 and frame aperture 28. After passing across the frame aperture 28, the film is directed on the horizontal to the exit sprocket 86. After leaving the film gate, the film goes to the telecine idler roller 56 (FIG. 3).

The lens assembly 26 is positioned in an open space defined between the entry end 51 and exit end 52, in an opening in the center support portion 74, and receives light from the light source 24. The lens assembly is supported for vertical movement in the central support portion 74 with upper and lower supports 77a, 77b. The barrel of the lens assembly includes a toothed rack 78 and is moved vertically for focusing the light with a gear 79 that is rotated by the knob 65 (FIG. 3). Once the light is properly focused onto the film plane, the lens assembly is locked into place with a locking screw moved by the locking knob 66 (FIG. 3).

Preferably, an optical shaft encoder is connected to the entry sprocket 85 beneath the front cover 60 for precise frame counting. The preferred optical shaft encoder comprises a thin, transparent disk 63 having precisely spaced markings that rotates within a light source and detector assembly 64. The light source and detector includes an integral light source and light detector that is operative for transmitting light through the disk 63 and detecting the passage and interruption of the light caused by the markings on the disk. Inasmuch as the structure of such optical shaft encoders will be known to those skilled in the art, no further discussion is believed necessary.

For providing stationary pin registration, a pin assembly 14 is mounted on roller bearings for vertical movement relative to the aperture plate 27. The pin assembly 14 comprises horizontal pin support arms 202 that support registration pins 204. To repeatably and reliably pin-register a selected frame of film within a predetermined error margin, the pins 204 are lowered into film sprocket holes.

The pin support arms are supported for vertical movement by a pin arm cam plate 207. The pin arm cam plate 207 is supported on a roller bearing assembly 208 for vertical movement. A stepper motor 36 is mounted to the support portions 71, 72 with its shaft 211 extending horizontally toward the center of the film gate. An eccentric cam 213 is mounted to the end of the shaft 211, and drives the pin arm cam plate 207 up and down as the stepping motor rotates, to raise and lower the pins.

Preferably, the stepper motor 36 is a model HY-100 manufactured by Digital Motor Corporation. It will be appreciated that the power rating of the motor generally affects the speed at which the system can engage and release a frame of film, but that an excessively powerful motor can "punch" holes in the film under failure conditions. Therefore, in addition to the safety features of position detection, it is preferred to employ a less powerful motor as an additional safety feature to minimize the possibility of film damage in the event of a failure.

The pin arm cam plate 207 is spring biased downwardly by a coil spring 214 positioned between the bottom surface of the telecine light detecting means 30 and the top surface of the pin assembly. The spring forces the pin assembly downwardly to engage the pins into the film perforations when the stepper motor releases the assembly by rotating the cam 213. Preferably, a spring is employed that is not sufficiently strong to punch holes in the film.

A spring-loaded film stripper 216 is mounted for downwardly pivotable movement to the underneath side of the pin support arms 202. As the registration pins 204 lift away from the aperture plate 27, the spring-loaded film stripper is urged downwardly away from the pin support arms and biases the film away from and off of the registration pins, to leave the film on top of the aperture plate.

Figure 5:
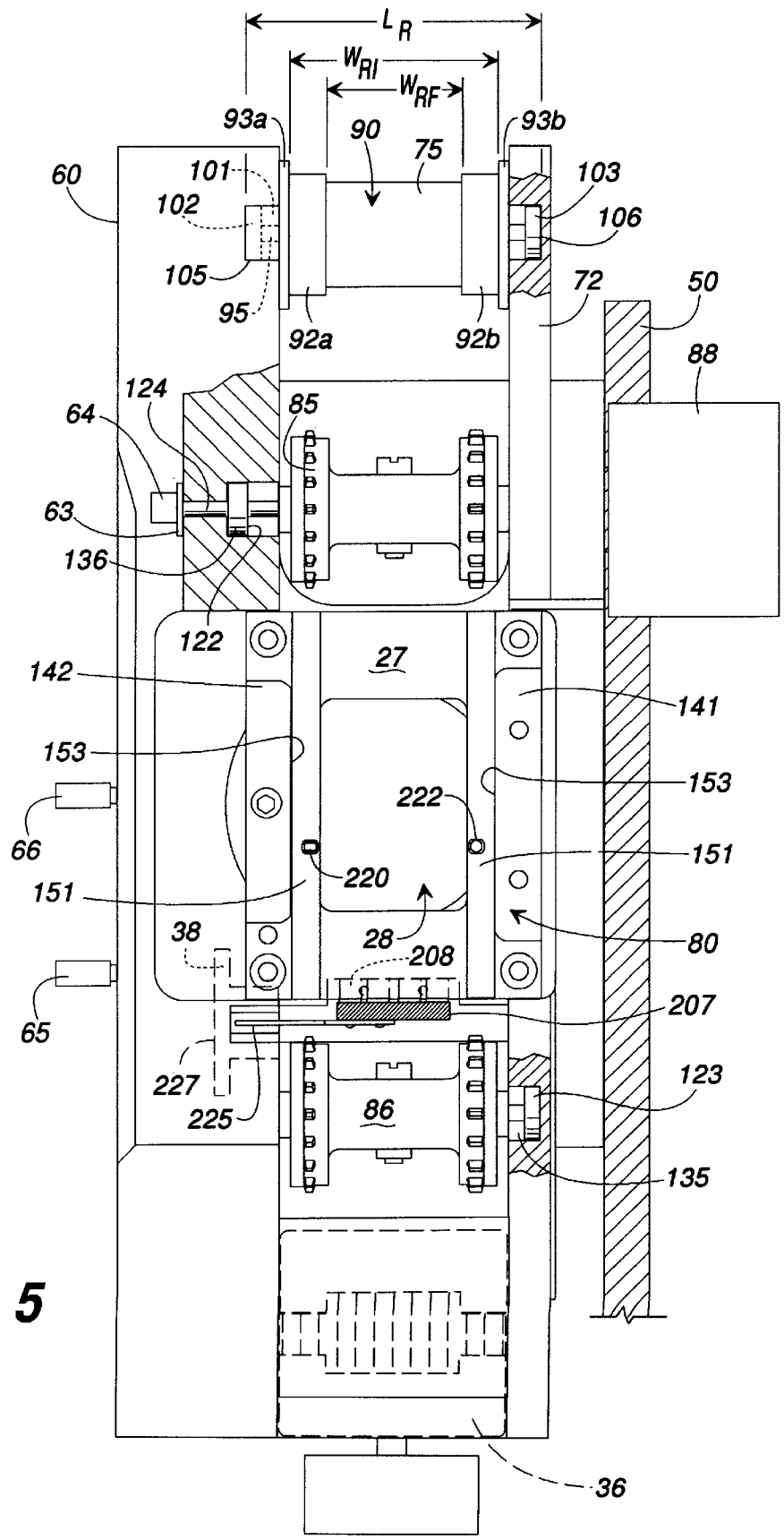
FIG. 5 is a top plan view of the preferred film gate shown in FIG. 4, with the pin assembly removed.

Turning now to FIG. 5, in the disclosed embodiment a conventional shaft encoder 88 is affixed to the axle of, and rotates with, the sprocket 85. This shaft encoder provides movement signals to the telecine 8 in the usual manner, for detecting "active stop" to center a frame on a monitor associated with the telecine. The shaft encoder 88 extends into an opening defined in the front panel 50 of the telecine and is housed therein during normal operation.

As best seen in FIG. 5, the entry guide roller 75 is precision milled from metal and includes a central recessed portion 90, outer guide portions or rims 92a, 92b that serve as confining edge guides, and film edge supports 93a, 93b. The distance between the outer guide portions or rims 92a, 92b is a width $W_{RF}$ substantially the same as that of the film 12. In the preferred embodiment, the width $W_{RF}$ is 35.025 mm, ±0.001 mm, which is slightly less than the upper limit of the ANSI standard for 35 mm film. The ANSI standard (PH22.93-1980) for a 35 mm film is 34.975±0.025 mm. It will thus be appreciated that the film is substantially confined within the outer guide portions or rims 92a, 92b that serve as confining edge guides of the entry guide roller 75 as it enters the film gate, and that these rollers impart substantial stability to the film as it moves.

Alternatively, if desired, a precision milled exit roller (not shown) constructed and described in the referenced U.S. Pat. No. 5,266,979 may be provided for additional stability. If employed, such an exit guide roller would be positioned to receive the film after it leaves the exit sprocket 86. However, in the preferred embodiment only a single entry guide roller 75 is employed and provides satisfactory stability.

The central recessed portion 90 is provided on the roller 75 so that the imaged or exposed area of the film 12 does not touch or otherwise contact with the rollers, to prevent scratching or other damage to the film. It will thus be understood that the film is supported on the film edge supports 93a, 93b that contact with and support the perforated film edges. The distance between the film edge supports 93a, 93b in the preferred embodiment is a width $W_{RI}$ substantially that of the imaged or exposed area of the film 12, that is, the width of the film A less twice the width (diameter) $C_d$ of a perforation plus the edge to perforation distance E, at least within the tolerances for that of the film itself.

The entry exit roller 75 is supported for free rotatable motion with an axle 95. As best seen in FIGS. 4 and 5, the guide roller 75 is supported within a cavity 101 defined in the housing 70 above the center support portion 74 and between the support portions 71, 72, and have an overall longitudinal dimension $L_R$. Precision roller bearings 102, 103 are press-fitted to the axle 95 for rotatable motion but substantially prevent any axial movement of the entry guide roller. The preferred roller bearings 102, 103 have a ¼ inch interior bore, ¾ inch exterior, and permit less than 0.0005 inches of longitudinal (axial) movement, such as a model 607-ZZ precision bearing manufactured by Consolidated Bearing Company.

Wells 105, 106 are provided in the outer support portion 71 and inner support portion 72, respectively, for supporting the roller 75 and associated bearings. The depth of these wells, ¾ inch in the disclosed embodiment, is precisely machined so that the rollers and their press-fitted bearings fit tightly in the cavity 101 but are free for rotatable movement with extremely little axial movement. Accordingly, the longitudinal cavity dimension $L_R$ is same as the overall longitudinal dimension of the roller 75 including its respective axles and bearings, within a predetermined longitudinal tolerance of ±0.0005 inches or less.

While the preferred embodiment employs tightly machined wells and finely toleranced parts to minimize axial movement of the rollers, it will be understood that a locking mechanism or screws could be employed to provide for axially adjusting and locking the position of the rollers.

Being slightly on the high side of the film width specification, the outer edge guides 92a, 92b of the roller 75 confine the film within a channel defined by edge guides. It will be seen in FIG. 4 that the roller 75 is mounted to the housing 70 such that the film 12 contacts with a circumferential portion of the rollers, an angular sector within the range of about 10°–25°. This is believed to provide sufficient contact between the film 12 and the guide roller to substantially stabilize the film before it leaves the roller. When compared to the width of the standard film guides employed in the Rank Cintel Mark III, at 36.5 mm, a guide roller constructed in accordance with the present invention imparts substantial lateral stability to the film as it moves onto the entry sprocket 85.

Still referring to FIG. 5, it will be noted that the pin assembly 14 has been removed to show the aperture plate. In particular, note that the aperture plate is provided with a pair of pin registration recesses 220, 222 for receiving the registration pins 204. These pin registration recesses are precision milled into a front film edge support rail 151a and rear film edge support rail 151b, respectively, and have different dimensions, as will be described in connection with FIG. 11. The edge support rails 151a, 151b support the sprocketed film edges above the surface of the aperture plate 27. The film 12 is confined between edge guides 153a, 153b which extend vertically from the aperture plate 27.

Also visible in the top view of FIG. 5 is a position interrupter arm 225 that is attached to the pin arm cam plate 207. This interrupter arm is employed to detect whether the pin assembly is in a lowered position with pins engaged in the film or in an upper position for continuous film movement. The interrupter arm 225 travels in a vertical path; when the pin assembly is in the lowered position, the arm interrupts a light beam provided by an optical transmitter/receiver that forms the position detector 38, and generates a signal indicative that the pin assembly is in the lowered position.

Figure 7:
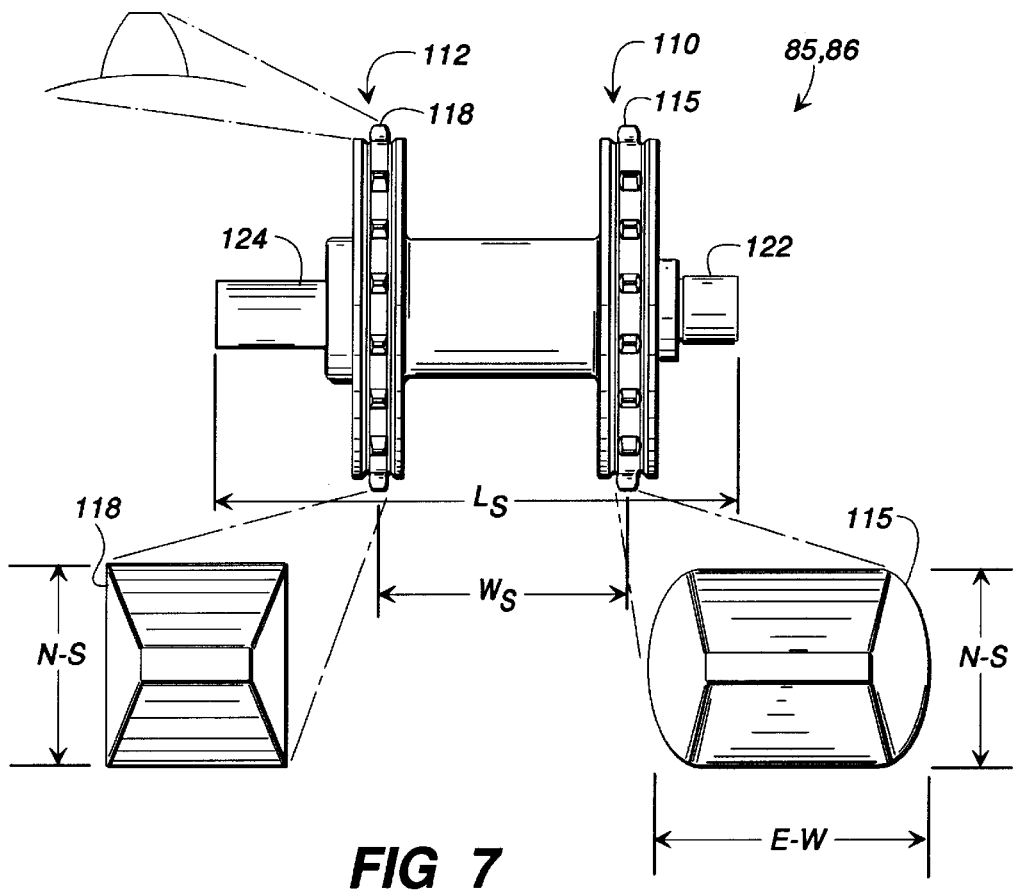
FIG. 7 illustrates a precision milled sprocket employed as an entry sprocket and an exit sprocket in the preferred film gate of FIG. 4, with magnified top views of the sprocket tines or teeth.

Other means are provided in the present invention for substantially reducing, if not eliminating, film weave. FIG. 7 illustrates one of the precision milled sprockets 85, 86 that comprise further means for reducing film weave and jitter. Each sprocket 85, 86 in the preferred embodiment is mounted in the housing 70 adjacent to the aperture plate 27 and directs the film along a horizontal path across the frame aperture 28, with the entry sprocket 85 guiding the film on to the aperture plate and the exit sprocket 86 leading the film away from the aperture plate.

It being understood that the sprockets 85 and 86 are similarly constructed, each sprocket 85 includes a ring of first sprocket teeth 110 and the ring of sprocket teeth 112. Each tooth or tine 115 of the ring 110 of first sprocket teeth are sized and shaped substantially in accordance with both the lateral (E-W) and longitudinal dimensional (N-S) specifications for the film sprocket holes, as determined by the above referenced ANSI standard. An exploded of one of the teeth 115 in the ring of first teeth 110 is shown expanded in FIG. 7.

Each tooth or tine 118 of the ring 112 of second teeth are sized and shaped substantially in accordance with the longitudinal (N-S) dimensional specifications for the film sprocket holes, according to the ANSI standard, and thus is smaller than the teeth 115 in the E-W direction. An exemplary one of the smaller sprocket teeth 118 is shown in the expanded view of FIG. 7.

The rings 110, 112 of sprocket teeth are spaced apart at a width $W_S$ according by that of the referenced ANSI standard specification for 35 mm film width, within the tolerance of that for the film itself.

Both entry and exit sprockets 85, 86 are supported for free rotatable motion with an axle 124. As best seen in FIGS. 4, 5 and 7, the sprockets 85, 86 are supported within the cavity 101 defined in the housing 70 and have an overall longitudinal dimension $L_S$ (including bearings). Precision roller bearings 122, 123 are press-fitted to the axle 124 for rotatable motion but substantially prevent any axial movement of the sprockets. The preferred roller bearings 122, 123 are similar to those used in connection with the rollers, have a ¼ inch interior bore, ⅜ inch exterior, and permit less than 0.0005 inches of longitudinal (axial) movement, such as a model 607-ZZ precision bearing manufactured by Consolidated Bearing Company.

Wells 135, 136 are provided in the outer support portion 71 and inner support portion 72, respectively, for supporting the sprockets 85, 86 and associated bearings. The depth of these wells is ¾ inch in the disclosed embodiment and is precisely machined so that the sprockets and their press-fitted bearings fit tightly in the cavity 101 but are free for rotatable movement with extremely little axial movement. Accordingly, the cavity dimension $L_S$ is same as the overall longitudinal dimension of the sprockets 85, 86 including their respective axles and bearings, within a predetermined longitudinal tolerance of ±0.0005 inches or less.

While the preferred embodiment employs tightly machined wells and finely toleranced parts to minimize axial movement of the sprockets, it will be understood that a locking mechanism or screws could be employed to provide for axially adjusting and locking the position of the sprockets. Moreover, it will also be understood that the axles in the preferred embodiment are actually longer than $L_S$ so as to provide for attachment of the encoder disk 63 and optical shaft encoder 88.

Those skilled in the art will understand and appreciate that the combination of the tightly maintained dimensions (and tolerances) for the sprocket, the preferred roller bearings, and the cavities for supporting the roller bearings provide an extremely stable rolling platform for the sprockets 85, 86 that permits substantially no lateral (axial) movement of the sprockets.

Figure 8:
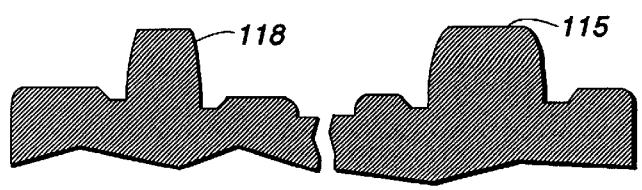
FIG. 8 provides front and side elevation views of the sprocket tines or teeth employed in the sprocket of FIG. 7.

As shown in FIG. 8, each tooth 115 in the ring 110 of first sprocket teeth is precision milled at its base (the juncture with the circumferential support surface of the sprocket) to dimensions substantially in accordance with the longitudinal and lateral dimensional specifications for the film sprocket holes, with Bell & Howell (B&H) perforations, including Kodak rounded (KR) corners. It will also be observed that each tooth 118 of the ring 112 of second sprocket teeth are also manufactured and milled substantially in accordance with the longitudinal dimensional specification (that is, in a circumferential direction) substantially in accordance with the longitudinal dimensional specification for the film sprocket holes. It will therefore be appreciated that the larger sprocket teeth 115 provide full registration in both the east-west (E-W) and the north-south (N-S) direction in the film sprocket holes, whereas the smaller sprocket teeth 118 provides registration in the N-S direction. This provides for full registration and lateral and longitudinal stability for movement of the film yet, still allows for film shrinkage. It is believed important to have N-S registration on both teeth so as to provide for lateral stability.

In comparison, only a single sprocket is provided in the Rank Cintel Mark III telecine, not dual sprockets, and the teeth in both rings in the sprocket are of the same size and shape. Moreover, the teeth in the Rank film gate sprocket are manufactured, it is believed, to roughly ten percent tolerance values as opposed to the ten micron tolerance values as in the present invention. It will therefore be understood that the conventional single Rank film gate sprocket does not and cannot provide full pin registration in either row of sprocket holes in the film, and substantial weave is not only possible, but inevitable.

Referring again to FIG. 4, it will be recalled that the film 12 enters the aperture plate 27 and passes over the frame aperture 28 along a substantially horizontal plane or pathway. It will be seen that the entry sprocket 85 is mounted to the housing 70 such that the film 12 contacts with a circumferential portion of the entry sprocket 85 (an angular sector of approximately 30°–45°), yet exits the entry sprocket at a tangent to the entry sprocket and then on to the horizontal pathway. This is believed to provide sufficient contact between the film 12 and sprocket 85 to register 3–5 teeth in the film and substantially stabilize the film before it passes across the frame aperture.

It will also be seen in FIG. 4 that the exit sprocket 86 is mounted to the housing 70 such that the film exits the horizontal pathway from the aperture plate 27, enters the exit sprocket tangentially, and thence contacts with a similar circumferential portion of the exit sprocket (an angular sector of approximately 30°–45°) before being directed downwardly at an angle to the exit guide roller 76. Again, this is believed to provide sufficient contact between the film 12 and sprocket 86 to register 3–5 teeth in the film and maintain stability in the film as it leaves the frame aperture.

Yet other means are provided in the preferred film gate 10 for stabilizing the film and reducing weave. The top plan view of FIG. 5 illustrates edge guide means 80 mounted to the housing 70 for supporting and steadying the film as it moves past the film aperture 28. The edge guide means 80 in the preferred embodiment comprises a ceramic first edge guide 141 that is mounted along one side of the film aperture 28, preferably the inside or telecine side, oriented in the direction of film travel. A ceramic second edge guide 142 is mounted on the opposite side of the frame aperture 28, preferably on the outside or front cover side. It will thus be understood that, in the preferred embodiment, the second edge guide 142 is aligned with the larger teeth 115 of the first row 110 of teeth in the sprockets 85, 86, while the first edge guide 141 is aligned with the smaller teeth 118 of the second row 112 of teeth in the sprockets. Preferably, the edge guides 141, 142 are fabricated from ceramic material for long wear life, and are bolted to the top of the aperture plate 27.

The aperture plate 27 preferably comprises a horizontal skid rail 151a for slidably supporting the film edge but not contacting the imaged portion of the film. The horizontal skid rail 151a is preferably a surface of the aperture plate 27, slightly elevated relative to the surface of the aperture plate. Preferably, the horizontal skid rail 151a is slightly tapered at the leading edges so as to minimize the likelihood of "catching" on a film splice or broken film perforation.

Similarly, the aperture plate 27 comprises a horizontal skid rail 151b for slidably supporting the opposite film edge. The horizontal skid rail 151b is also preferably a surface of the aperture plate 27.

Preferably, the surfaces of the horizontal skid rails 151a, 151b are polished stainless steel surfaces to minimize drag and wear on the film.

It will understood from the foregoing that the ceramic edge guides 141, 142 confine the edges of the film. It will also be appreciated that the edge guide means 80 confines and stabilizes the film 12 as it is moved across the frame aperture 28, lending further lateral stability to the film during scanning by the telecine. By itself, and in combination with the other stabilizing elements of dual sprockets 85, 86 and guide roller 75, the edge guide means substantially reduces weave and jitter during scanning of the film.

From the foregoing, it will now be appreciated that the larger or first sprocket teeth 115 maintain a snug fit in a plurality of perforation holes of the film to one side of the image in both the N-S and the E-W direction, to provide full perforation registration, while the other, smaller pins 118 maintain a loose clearance fit in the E-W direction but a snug fit in the N-S direction. It will therefore be appreciated that given reasonable limits and variations in film tolerance, the film will be located in both planes in a very satisfactory and stable manner. The combination of the entry guide roller, entry sprocket, substantially horizontal film path, exit sprocket, and edge guide means imparts substantial longitudinal and lateral stability to a film as it passes over the frame aperture and is scanned by the telecine in continuous movement.

It will be further appreciated that the present invention restores the sprocket hole/image relationship that is determined as a function of the placement of the image on the film in the camera, and thus the stability of the picture as respects weave is substantially improved compared to that of conventional telecine devices used in production and post-production facilities. Post-production activities such as mattes, titles, computer graphics and motion control material and animation can now be steadily interwoven and imposed with moving film in a manner that has heretofore not been possible prior to the present invention without the use of complex and expensive electronic film weave compensation devices. With the use of the present invention, the amount of weave and jitter in many telecines may be effectively and inexpensively reduced to less than 20 nanoseconds.

Modifications to the present invention may occur to those skilled in the art. It is specifically contemplated that a sprocket such as the sprockets 85, 86 may be substituted for the roller 75 and thereby provide further stabilization for the film. Moreover, it is also expected that the relative positions of the sprockets and rollers may be interchanged, so that the sprockets are positioned at the entry points to the film gate with the rollers adjacent to the frame aperture 28, or that the sprockets and rollers may alternate. Accordingly, it will be appreciated that the positioning of the sprockets and rollers may be varied in position and number while satisfying the objectives of the invention.

Figure 9:
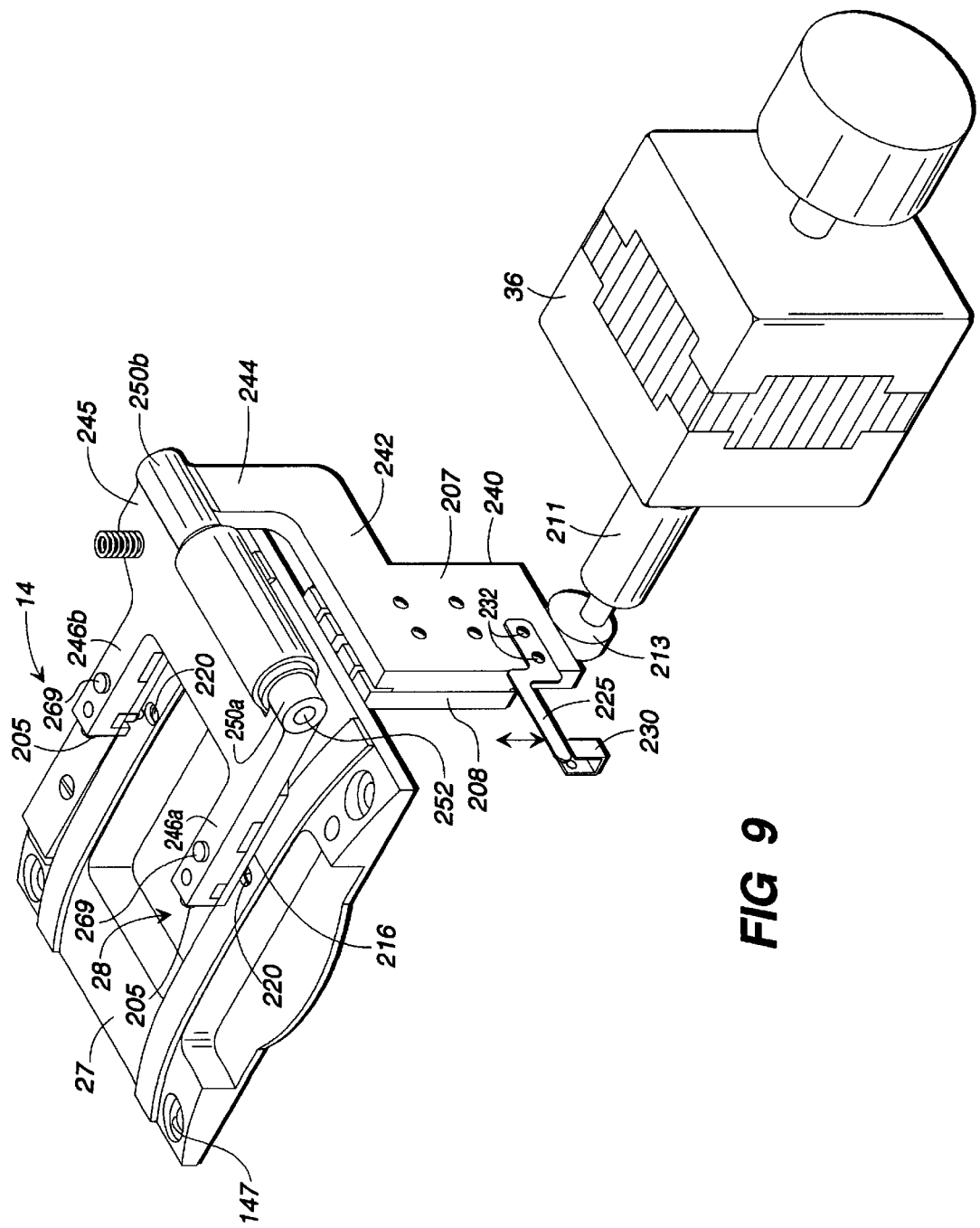
FIG. 9 is a perspective view of the aperture plate, pin assembly, and stepper motor employed in the preferred combination film gate.

Referring now to FIG. 9 for more details of the pin assembly 14, the pin arm cam plate 207 is preferably fabricated from metal and comprises a lower portion 240 whose bottom edge contacts with the cam 213, a horizontally extending support arm 242, a vertically extending support arm 244, a horizontal pin arm support plate 245, and a pair of pin mounting arms 246a, 246b extending horizontally from the pin arm support plate 245 outwardly toward and over the aperture plate 27. Also provided on the pin arm cam plate is a pair of axle bearings 250a, 250b which receive an axle 252 that supports the film stripper 216 for downwardly pivotable movement. Pins 204 are affixed to the ends of the pin mounting arms 246a, 246b by fitting upper pins shafts 288 (FIG. 12) into receptacles provided in the arms and fastening with set screws 205.

The interrupter arm 225 is mounted to the pin arm cam plate 207 with screws 232 so that the position of the interrupter arm can be adjusted vertically relative to the optical light transmitter/receiver. This allows adjustment of the interrupter arm so that the position sensor can detect when the pins have cleared the aperture plate, and/or when the pins are engaged with the aperture plate.

FIG. 10 is an exploded view of the pin assembly 14 and shows the construction of the film stripper 216 relative to the cam plate 207. The film stripper 216 comprises a cylindrical central axle support 255 that receives the axle 252, a horizontal stripper arm support plate 257 attached to a circumference of the axle support, and a pair of stripper arms 260a, 260b that are integral with and extend horizontally from the stripper arm support plate. The axle 252 extends through the axle bearing 250a, the central axle support 255, and press fit into the axle bearing 250b to support the stripper arms for rotatable movement. Washers are preferably provided between the axle bearings and axle support.

The stripper arms 260a, 260b each include a semicircular cut-out 262 that allows the pins 204 to extend through the cut-out and engage with the film sprocket holes and pin registration recesses 220, 222 in the aperture plate. Further, each stripper arm 260a, 260b is provided with a small stripper arm down stop 261a, 261b, respectively, that rests on top of the ceramic guides 141, 142 to limit the downward travel of the pin assembly when the pins are lowered. The stripper arm down stops 261a, 261b are fastened to the top of the stripper arms, and fit in a corresponding recess 264 provided in the stripper arms when the stripper arms.

The stripper arms 260 are biased downwardly by coil springs 265 positioned between the stripper arms and the pin mounting arms 246. When the pin assembly lifts away from the aperture plate to assume the raised position with pins disengaged from the film and aperture plate, the springs push the stripper arms downward to urge the film away from and off of the pins.

The coil springs 265 are mounted on support rods 267. The support rods 267 are press fit into corresponding receptacles provided on the upper surface of the stripper arms, extend upwardly inside the springs, and protrude with a sliding fit through an opening 268 provided in the top surface of the stripper arms. A stop cap 269 is press fit onto the protruding top of each support rod 267; the stop caps limit the downward movement of the stripper arms when the pin assembly is in the raised position with pins disengaged. The stripper arms are biased downwardly by the springs 265, but the stop caps affixed to the support rods prevents the stripper arms from dangling down and interfering with the film movement (see FIG. 13D).

The cam plate 207 is supported for vertical movement by the roller bearing assembly 208. The preferred roller bearing assembly comprises a pair of fixed side rails 267a, 267b that are fastened with screws into the housing 70, and a pair of slideable center rails 268a, 268b that are fastened with screws to the cam plate 207. The center rails are supported for slideable movement with roller bearings disposed between the center rails and the fixed rails, in the known manner.

FIG. 11 illustrates details of the milling defining the pin registration recesses 220, 222. As described previously, the pin registration recesses are different. The pin registration recess 220 on the outside (that is, away from the telecine) is preferably precision milled to provide (1) a first, generally rectangular upper cavity 270, with (2) a second, deeper, slightly narrower, slotted lower cavity 272. The tolerance of all milling is ±0.002 mm. The lower cavity 272 is hemispherically milled and provides a kinematic fit.

The pin registration recess 222 on the inside (that is, closest to the telecine) is milled to provide (1) a first, generally rectangular upper cavity 276, with (2) a second, deeper, and hemispherical lower cavity 278, having a width less than that of the upper cavity. The lower cavity 278 is preferably not milled to define a complete hemisphere; rather, the lower cavity is preferably milled to approximately 40% of the diameter of the pin ball 280 so as to minimize the likelihood that the pin will "stick" in the cavity.

Both upper cavities 270, 276 are milled to 2.354 mm wide (in the direction across the aperture plate), 2.108 mm tall, 1.5 mm deep.

The lower cavity 272 that provides the kinematic fit is 2 mm wide (slotted) in the direction across the aperture plate, 1.58 mm diameter, 0.780 mm deep relative to the bottom of the upper cavity 270.

The lower cavity 278 that is a precise fit is 1.58 mm diameter, 0.780 mm deep relative to the bottom of the upper cavity 276.

Preferably, the tolerance of the milling for the registration pins and for their corresponding recesses is on the order of ±0.0001 inch. The tolerance of the milling of other components in the preferred embodiment are on the order of ±0.001.

FIG. 12 shows the details of the registration pins 204. Each registration pin comprises a hemispherical lower portion or ball 280, an offset lower pin shaft 282, a pin plate 284, and an upper pin shaft 288. The hemispherical lower portion or ball 280 has dimensions of 1.58 mm±0.002 mm. The offset lower pin shaft 282 is integral with and extends down from the pin plate 284, offset from the center of the pin plate. The lower pin shaft 282 bears the dimensions of the film perforations (FIG. 2), with a tolerance of ±0.001 inch, except tapers beginning at a point 1 mm from the pin plate smoothly to the beginning of the hemispherical lower portion 280.

The upper pin shaft 288 is centered with the pin plate 284, and has a diameter of 2.5 mm. The upper pin shaft 288 is preferably a tight fit into a corresponding hole provided in the pin mounting arms 246 and is fastened with a set screw. The offset lower pin shaft 282 is offset from the center of the registration pin because the center of the pin is not centered on the skid rails 151 on the aperture plate.

The pins 204 may be adjusted in height by use of the set screws 205, which are threaded into bores accessible from the ends of the pin mounting arms 246.

It will be appreciated that the above described structure for the registration pins 204 and corresponding pin registration recesses 220, 222 provide a kinematic mount that precisely, and repeatably, holds a selected film frame in position on the aperture plate. The outside recess 220 does not precisely match the hemispherical milling of the pin because of the slotting, but the inside recess 222 does precisely match the hemispherical milling. The result is that when the registration pin associated with the inside recess 222 is lowered into position into recess 278, it seats into the recess with a dimensional tolerance greater than that of the film perforations themselves. The pin associated with outside recess seats firmly into the spherical lower recess 272.

FIG. 13 illustrates the various positions of the pin assembly 14. In FIG. 13A, the pin assembly is in the lowered position, with pins engaged in the film perforations. In this position, the film stripper 216 is pressed against the film 12, and the registration pins hold the film firmly in a stationary position. The interrupter arm 225 affixed to the pin arm cam plate 207 blocks the light path in the optical position detector 38, providing a signal to the control circuitry that the pin assembly is in the lowered position.

In the preferred embodiment, the interrupter arm is adjustable in vertical position so that the position detector 38 provides a signal just as the pins begin to enter the film perforations and might interfere with or snag the film if movement should occur. The signal from the position detector is employed by the control electronics and telecine electronics to prevent the capstan from moving the film when the pin assembly might snag the film.

Optionally, circuitry could be provided that is responsive to the position detector signal to switch off drive current to the telecine capstan motor as an additional protective measure. Such an embodiment will preferably remove drive current from the capstan motor so that the motor does not resist the slight movement that may be imparted to the film by entry of the registration pins into the sprocket perforations. Although the film will "give" a bit, it may be preferable to allow the film to move slightly as opposed to stressing the film.

Figure 13B:
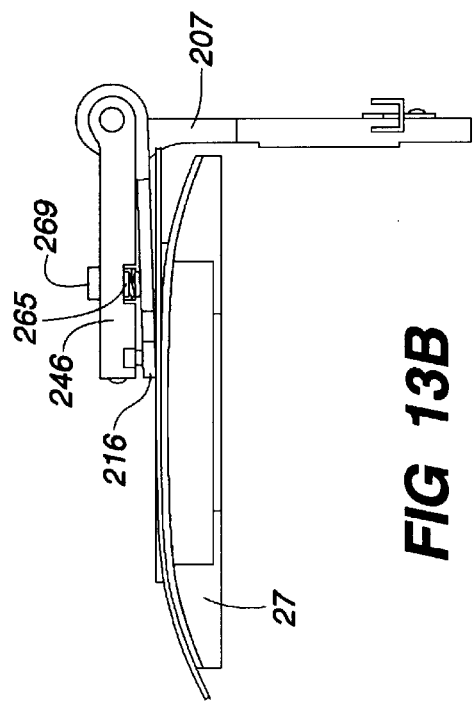
FIG. 13, consisting of FIGS. 13A through 13D, illustrate the various positions of the pin assembly.

In FIG. 13B, a command has been provided by the telecine control circuitry 25 (FIG. 1) to raise the pin assembly and release the film for continuous movement. Accordingly, the stepper motor 36 (not shown) actuates, raising the pin arm cam plate 207 and lifting the pins out of their corresponding recesses. The spring 265 biasing the film stripper 216 urges the film stripper downwardly, urging the film off the pins as the pins are raised.

Figure 13D:
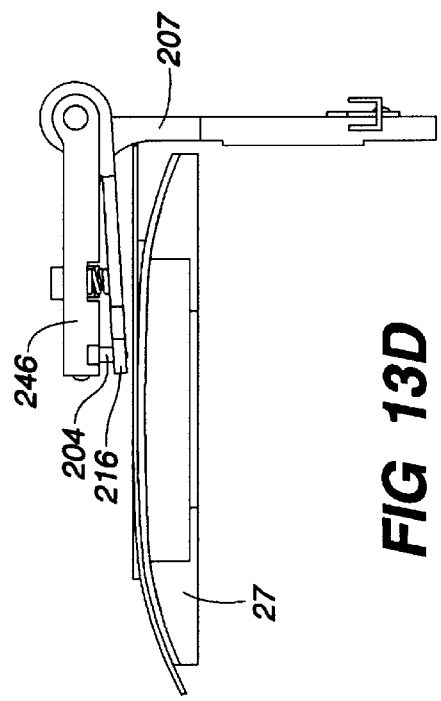
Figure 13A:
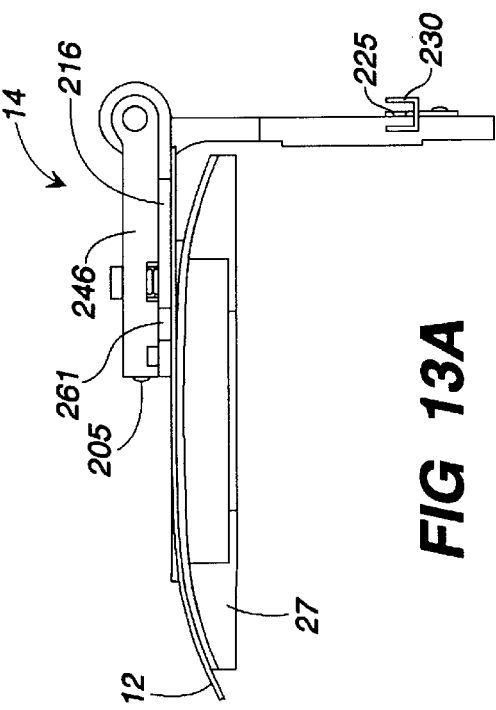
Figure 13C:
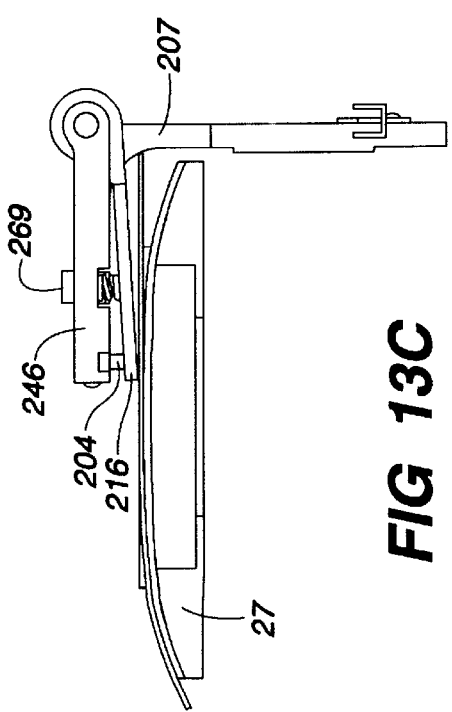

In FIG. 13C, the pins 204 have cleared the aperture plate. The film stripper 216 is now in its extended position, completely clear of the pins, so that the film has been urged off of the pins. The film stripper begins now to clear the aperture plate.

In FIG. 13D, the pin arm cam plate 207 has been raised to the top. In this position, the pins are clear of the aperture plate, and the film stripper 216 is also clear of the aperture plate so that the film can freely move.

The steps take place in the exact reverse order when the pins are to be engaged with the film perforations. Prior to lowering the pin assembly, however, preferably a READY signal is generated in the telecine to indicate that the capstan is completely stopped. The control electronics are preferably configured so that the stepping motor 36 will not lower the pins until receipt of the READY signal.

It will now be understood that there has been described and disclosed a combination continuous motion and stationary pin registered film gate that provides advantages not possible with prior art devices. For continuous motion operation, the system operates as described to substantially reduce film weave or jitter in a "real-time" or continuous motion telecine. For stop frame operation, the system is capable of repeatably, and reliably, pin registering a selected frame of film, so that the film frame can be scanned for purposes such as compositing, etc.

The preferred embodiment of the present invention has been disclosed by way of example and it will be understood that other modifications may occur to those skilled in the art without departing from the scope and the spirit of the appended claims.

What is claimed is:

1. A combination continuous motion and stationary pin registered film gate for a motion picture telecine, comprising:

a housing for supporting and transporting a film in continuous motion past a scanning means on the telecine, said housing including a frame aperture operative for receiving light from a light source that passes through the film and directing the light to the telecine scanning means;

film stabilizing means positioned proximate to said frame aperture for steadily guiding the film across said frame aperture during continuous motion operation;

a selectably engageable pin assembly operatively associated with said housing and including at least one precision milled registration pin for engaging with a film sprocket perforation to hold the film stationary for a stationary frame scan, the at least one precision milled registration pin having dimensions sized and shaped substantially in accordance with both the lateral and longitudinal dimensional specifications for a film sprocket perforation;

a hemispherical ball on the end thereof for seating in a recess provided in said frame aperture.

2. The combination film gate of claim 1, wherein said film stabilizing means comprises:

an entry sprocket positioned adjacent to said frame aperture for guiding the film across said frame aperture, said entry sprocket including a ring of first sprocket teeth and a ring of second sprocket teeth, at least one of said rings of said sprocket teeth being sized and shaped substantially in accordance with both the lateral and longitudinal dimensional specifications for the film sprocket holes.

3. The combination film gate of claim 1, wherein said film stabilizing means comprises:

an exit sprocket positioned adjacent to said frame aperture for receiving the film after passing across said frame aperture, said exit sprocket including a ring of first sprocket teeth and a ring of second sprocket teeth, at least one of said rings of said sprocket teeth being sized and shaped substantially in accordance with both the lateral and longitudinal dimensional specifications for the film sprocket holes.

4. The combination film gate of claim 1, wherein said film stabilizing means comprises:

an entry guide roller mounted to said housing for receiving the film from a feed spool, said entry roller having a central recessed portion of a width substantially the same as the film, and outer guide portions adjacent said recessed portion.

5. The combination film gate of claim 1, wherein said film stabilizing means comprises:

a film edge guide mounted to said housing for supporting and steadily guiding at least one edge of the film as it moves past said film aperture.

6. The combination film gate of claim 5, wherein said edge guide comprises:

a horizontal skid rail for slidably supporting the film edge, and an edge guide for contacting one edge of the film.

7. The combination film gate of claim 1, wherein said film stabilizing means comprises:

a precision milled entry guide roller;

a precision milled entry sprocket positioned adjacent to said frame aperture for guiding the film across said frame aperture; and a precision milled exit sprocket positioned adjacent to said frame aperture for receiving the film after passing across said frame aperture.

8. The combination film gate of claim 7, wherein the film passes over said frame aperture along a horizontal planar pathway, said entry sprocket is mounted to said housing such that the film contacts with a circumferential portion of said entry sprocket and exits said entry sprocket at a tangent and onto said planar pathway, said exit sprocket is mounted to said housing such that the film exits said planar pathway and contacts with said exit sprocket tangentially, and both said entry sprocket and said exit sprocket are mounted beneath the plane of said planar pathway.

9. The combination film gate of claim 7, wherein said entry sprocket and said exit sprocket comprise free rolling sprockets, and wherein the dimensions of said sprockets conform to ANSI standards for motion picture safety film, with Bell & Howell (B&H) perforations and Kodak rounded (KR) corners.

10. The combination film gate of claim 7, wherein the dimensions of the teeth of said sprockets are maintained within a tolerance of ±10 microns relative to predetermined standards for the film sprocket holes.

11. The combination film gate of claim 7, wherein said sprockets are mounted to said housing with means for preventing axial movement of said sprockets.

12. The combination film gate of claim 11, wherein said sprockets are rotatably supported by axles, and wherein said axial movement preventing means comprises:
   the longitudinal dimension of said sprockets including its respective axles being manufactured within a predetermined longitudinal tolerance;
   a sprocket well defined in said housing for receiving and supporting said sprockets and having a longitudinal dimension the same as the overall longitudinal dimension of said precision sprocket including its respective axles, within said predetermined longitudinal tolerance; and
   precision roller bearings for supporting said sprocket axles for rotation within said sprocket wells.

13. The combination film gate of claim 12 wherein said predetermined longitudinal tolerance is less than 0.0005 inches.

14. The combination film gate of claim 1, wherein the pin assembly comprises at least one pin support arm mounted to a cam plate, said pin support arm carrying said registration pin;
   wherein said frame aperture includes a pin registration recess in the surface of said frame aperture;
   wherein said pin assembly is mounted to said housing above said frame aperture; and
   further comprising means for lowering said cam plate with said pin support arm and said registration pin to engage said registration pin in said pin registration recess.

15. The combination film gate of claim 14, further comprising a film stripper for stripping the film off of said registration pin when said registration pin is disengaged from the film sprocket perforations.

16. The combination film gate of claim 15, wherein said film stripper comprises a spring-biased pivotable arm mounted beneath said pin support arm, with an opening defined therein for allowing said registration pin to protrude therethrough when engaging with a film sprocket perforation.

17. The combination film gate of claim 14, wherein said lowering means comprises a stepping motor, a cam affixed to the shaft of said stepping motor, said cam engaging with said cam plate to raise and lower said pin assembly.

18. The combination film gate of claim 1,
   wherein there is a pair of said registration pins,
   wherein said frame aperture includes a first recess and a second recess defined therein for receiving said registration pins,
   wherein said first recess is milled to define a cavity having substantially the same dimensions as the hemispherical ball of one of said registration pins, and
   wherein said second recess is milled to provide a rectangular cavity.

19. A combination continuous motion and stationary pin registered film gate for a motion picture telecine, comprising:

a housing for supporting and transporting a film in continuous motion past a scanning means on the telecine, said housing including a frame aperture operative for receiving light from a light source that passes through the film and directing the light to the telecine scanning means;

an entry sprocket positioned along a path prior to and adjacent to said frame aperture for guiding the film across said frame aperture, said entry sprocket including at least one ring of sprocket teeth being sized and shaped substantially in accordance with both the lateral and longitudinal dimensional specifications for the film sprocket holes;

an exit sprocket positioned along a path subsequent and adjacent to said frame aperture for receiving the film after passing across said frame aperture, said exit sprocket including at least one ring of sprocket teeth being sized and shaped substantially in accordance with both the lateral and longitudinal dimensional specifications for the film sprocket holes; and a selectably engageable pin assembly including at least one precision milled registration pin for engaging with a film sprocket perforation to hold the film stationary for a stationary frame scan, the at least one precision milled registration pin having dimensions sized and shaped substantially in accordance with both the lateral and longitudinal dimensional specifications for a film sprocket perforation;

a hemispherical ball on the end thereof for seating in a recess provided in said frame aperture.

20. The combination film gate of claim 19, further comprising an entry guide roller mounted to said housing for receiving the film from a feed spool and directing the film onto said entry sprocket, said entry roller having a central recessed portion of a width substantially the same as the film, and outer guide portions adjacent said recessed portion.

21. The combination film gate of claim 19, further comprising an edge guide mounted to said housing for supporting and steadily guiding at least one edge of the film as it moves past the film aperture.

22. The combination film gate of claim 21, wherein said edge guide comprises:
   a horizontal skid rail for slidably supporting the sprocket hole region of a film edge, and
   an edge guide for contacting an edge of the film.

23. The combination film gate of claim 19, wherein said housing is mounted to the telecine with said frame aperture being disposed on the top of said housing in a substantially horizontal configuration.

24. The improved film gate of claim 19, wherein the film passes over said frame aperture along a horizontal planar pathway,
   said entry sprocket is mounted to said housing such that the film contacts with a circumferential portion of said entry sprocket, and exits said entry sprocket at a tangent and onto said planar pathway,
   said exit sprocket is mounted to said housing such that the film exits said planar pathway, contacts with said exit sprocket tangentially to said exit sprocket, and
   wherein both said entry sprocket and said exit sprocket are mounted beneath the plane of said planar pathway.

25. The combination film gate of claim 19, wherein said entry sprocket and said exit sprocket comprise free rolling sprockets, and wherein the dimensions of said sprockets conform to ANSI standards for motion picture safety film, with Bell & Howell (B&H) perforations and Kodak rounded (KR) corners.

26. The combination film gate of claim 25, wherein the dimensions of the teeth of said sprockets are maintained within a tolerance of ±10 microns relative to predetermined standards for the film sprocket holes.

27. The combination film gate of claim 25, wherein said sprockets are mounted to said housing with means for substantially preventing axial movement of said sprockets.

28. The combination film gate of claim 27, wherein said sprockets are rotatably supported by axles, and wherein said axial movement preventing means comprises:

the longitudinal dimension of said sprockets including its respective axles being manufactured within a predetermined longitudinal tolerance;

a sprocket well defined in said housing for receiving and supporting said sprockets and having a longitudinal dimension the same as the overall longitudinal dimension of said precision sprocket including its respective axles, within said predetermined longitudinal tolerance; and precision roller bearings for supporting said sprocket axles for rotation within said sprocket wells.

29. The improved film gate of claim 28, wherein said predetermined longitudinal tolerance is less than 0.0005 inches.

30. The combination film gate of claim 19, wherein the pin assembly comprises pin support arms mounted to a cam plate, said pin support arms carrying a plurality of said registration pins;

wherein said frame aperture includes pin registration recesses in the surface of said frame aperture;

wherein said pin assembly is mounted to said housing above said frame aperture; and further comprising means for lowering said cam plate with said pin support arms and said registration pins to engage said registration pins in said pin registration recesses.

31. The combination film gate of claim 30, further comprising a film stripper for stripping the film off of said registration pins when said registration pins are disengaged from the film sprocket perforations.

32. The combination film gate of claim 31, wherein said film stripper comprises a spring-biased pivotable arm mounted beneath said pin support arms, with an opening defined therein for allowing said registration pins to protrude therethrough when engaging with the film sprocket perforations.

33. The combination film gate of claim 30, wherein said lowering means comprises a stepping motor, a cam affixed to the shaft of said stepping motor, said cam engaging with said cam plate to raise and lower said pin assembly.

34. The combination film gate of claim 20, wherein there is a pair of said registration pins, wherein said frame aperture includes a first recess and a second recess defined therein for receiving said registration pins, wherein said first recess is milled to define a cavity having substantially the same dimensions as the hemispherical ball of one of said registration pins, and wherein said second recess is milled to provide a rectangular cavity.

35. A combination continuous motion and stationary pin registered film gate for a motion picture telecine, comprising:

a housing for supporting and transporting a film in continuous motion past a scanning means on the telecine, said housing including a frame aperture operative for receiving light from a light source that passes through the film and directing the light to the telecine scanning means;

an entry guide roller mounted to said housing for receiving the film from a feed spool, said entry roller having a central recessed portion of a width substantially the same as the film and outer guide portions adjacent said recessed portion;

a precision milled entry sprocket positioned adjacent to said frame aperture for guiding the film across said frame aperture, said entry sprocket including a ring of first sprocket teeth and a ring of second sprocket teeth, said first sprocket teeth being sized and shaped substantially in accordance with both the lateral and longitudinal dimensional specifications for the film sprocket holes, said second sprocket teeth being sized and shaped substantially in accordance with the longitudinal dimensional specifications for the film sprocket holes;

a precision milled exit sprocket positioned adjacent to said frame aperture for receiving the film after passing across said frame aperture, said exit sprocket including a ring of first sprocket teeth and a ring of second sprocket teeth, said first sprocket teeth being sized and shaped substantially in accordance with both the lateral and longitudinal dimensional specifications for the film sprocket holes, said second sprocket teeth being sized and shaped substantially in accordance with the longitudinal dimensional specifications for the film sprocket holes;

a selectably engageable pin assembly including precision milled registration pins for engaging with film sprocket perforations to hold the film stationary for a stationary frame scan, said precision milled registration pins having dimensions sized and shaped substantially in accordance with both the lateral and longitudinal dimensional specifications for a film sprocket perforation; and means for engaging and disengaging said registration pins of said pin assembly with the film sprocket perforations.

36. An improved continuous motion film gate for a motion picture telecine, comprising:

a housing for supporting and transporting a film in continuous motion along a horizontal planar pathway past a scanning means on the telecine, said housing including a frame aperture operative for receiving light from a light source that passes through the film and directing the light to the telecine scanning means;

an entry guide roller mounted to said housing for receiving the film from a feed spool, said entry roller having a central recessed portion of a width substantially the same as the film, and outer guide portions adjacent said recessed portion;

a precision milled entry sprocket positioned adjacent to said frame aperture for guiding the film across said frame aperture, said entry sprocket including a ring of first sprocket teeth and a ring of second sprocket teeth, said first sprocket teeth being sized and shaped substantially in accordance with both the lateral and longitudinal dimensional specifications for the film sprocket holes, said second sprocket teeth being sized and shaped substantially in accordance with the longitudinal dimensional specifications for the film sprocket holes, said entry sprocket being mounted to said housing beneath the plane of said planar pathway such that the film contacts with a circumferential portion of said entry sprocket, and exits said entry sprocket at a tangent to said entry sprocket and onto said planar pathway, a precision milled exit sprocket positioned adjacent to said frame aperture for receiving the film after passing across said frame aperture, said exit sprocket including a ring of first sprocket teeth and a ring of second sprocket teeth, said first sprocket teeth being sized and shaped substantially in accordance with both the lateral and longitudinal dimensional specifications for the film sprocket holes, said second sprocket teeth being sized and shaped substantially in accordance with the longitudinal dimensional specifications for the film sprocket holes, said exit sprocket being mounted to said housing beneath the plane of said planar pathway such that the film exits said planar pathway, contacts with said exit sprocket tangentially to said exit sprocket, and thence contacts with a circumferential portion of said exit sprocket;

at least one edge guide mounted to said housing for supporting and steadily guiding at least one edge of the film as it moves past the film aperture, said edge guide being affixed to said housing and comprising a horizontal skid rail for slidably supporting the film edge and a vertical rail for contacting one edge of the film; and a selectably engageable pin assembly including registration pins for engaging with film sprocket perforations to hold the film stationary, said precision milled registration pins having dimensions sized and shaped substantially in accordance with both the lateral and longitudinal dimensional specifications for a film sprocket perforation.

\* \* \* \* \*